(12) United States Patent
Mandalika et al.

(10) Patent No.: US 11,671,429 B1
(45) Date of Patent: Jun. 6, 2023

(54) AUTHORIZATION AUTOMATION IN PROCUREMENT OF INTERCONNECTIONS WITHIN A DATA CENTER

(71) Applicant: Equinix, Inc., Redwood City, CA (US)

(72) Inventors: Sirish Mandalika, Fremont, CA (US); Suraj Prakash Dasika, Santa Clara, CA (US); Amritpal Singh Sahota, Fremont, CA (US)

(73) Assignee: EQUINIX, INC., Redwood City, CA (US)

( * ) Notice: Subject to any disclaimer, the term of this patent is extended or adjusted under 35 U.S.C. 154(b) by 210 days.

(21) Appl. No.: 16/802,296

(22) Filed: Feb. 26, 2020

(51) Int. Cl.
| | |
|---|---|
| *H04L 41/22* | (2022.01) |
| *H04L 9/40* | (2022.01) |
| *H04L 67/146* | (2022.01) |
| *G06F 3/04847* | (2022.01) |
| *H04L 67/10* | (2022.01) |

(52) U.S. Cl.
CPC .......... *H04L 63/10* (2013.01); *G06F 3/04847* (2013.01); *H04L 41/22* (2013.01); *H04L 63/08* (2013.01); *H04L 67/146* (2013.01); *H04L 67/10* (2013.01)

(58) Field of Classification Search
CPC ......... H04L 63/10; H04L 41/22; H04L 63/08; H04L 67/146; H04L 67/10; H04L 67/145; G06F 3/64847; G06F 3/04842
USPC ................. 709/220, 224, 226, 228
See application file for complete search history.

(56) References Cited

U.S. PATENT DOCUMENTS

| | | | |
|---|---|---|---|
| 6,144,975 A | 11/2000 | Harris, Jr. et al. | |
| 8,537,845 B2 | 9/2013 | Waldrop et al. | |
| 9,641,394 B2 | 5/2017 | Jubran et al. | |
| 9,886,267 B2 | 2/2018 | Maheshwari et al. | |
| 9,948,552 B2 | 4/2018 | Teng et al. | |
| 9,979,596 B2* | 5/2018 | Subramanian | H04L 41/0853 |
| 10,015,268 B2 | 7/2018 | Rao et al. | |
| 10,122,578 B1* | 11/2018 | Magerramov | H04L 41/0813 |
| 10,218,658 B2 | 2/2019 | Parizhsky et al. | |
| 10,318,747 B1* | 6/2019 | MacCarthaigh | H04L 9/3247 |
| 10,382,266 B1* | 8/2019 | Balakrishnan | H04L 67/55 |
| 10,623,680 B1* | 4/2020 | Rangasamy | G06K 9/00711 |
| 10,771,252 B1* | 9/2020 | Teng | H04L 9/08 |
| 10,785,652 B1* | 9/2020 | Ravindranath | H04W 12/48 |
| 10,880,743 B1* | 12/2020 | Berzin | H04L 41/0806 |
| 10,887,276 B1* | 1/2021 | Parulkar | H04L 61/4511 |
| 10,965,737 B1* | 3/2021 | Parulkar | H04L 63/16 |

(Continued)

*Primary Examiner* — Khanh Q Dinh

(74) *Attorney, Agent, or Firm* — Shumaker & Sieffert, P.A.

(57) ABSTRACT

In some examples, a method includes obtaining, by a computing device operated by a data center provider for a data center, from a first customer of the data center provider, order information comprising a set of parameters defining an interconnection within the data center between a first customer network of the first customer and a second customer network of a second customer of the data center provider, wherein the first customer network and the second customer network are co-located in the data center; sending, by the computing device to the second customer, a communication comprising a unique identifier that maps to the set of parameters; and outputting, by the computing device, an indication of authorization for the interconnection based upon an authorization directive from the second customer, the authorization directive comprising the unique identifier.

17 Claims, 4 Drawing Sheets

(56) References Cited

U.S. PATENT DOCUMENTS

| | | | |
|---|---|---|---|
| 10,979,534 B1* | 4/2021 | Parulkar | G06F 9/5072 |
| 11,044,326 B2* | 6/2021 | Madden | H04L 67/104 |
| 11,228,513 B2* | 1/2022 | Huang | H04L 43/0811 |
| 11,245,592 B1* | 2/2022 | Thomson | H04L 41/145 |
| 11,252,655 B1* | 2/2022 | Gupta | G06F 9/445 |
| 11,310,733 B1* | 4/2022 | Gupta | H04W 28/0967 |
| 11,422,844 B1* | 8/2022 | Filiz | H04L 67/10 |
| 11,461,123 B1* | 10/2022 | Tsai | G06F 9/45558 |
| 11,470,047 B1* | 10/2022 | Shevade | H04L 67/10 |
| 2004/0024646 A1 | 2/2004 | Iry et al. | |
| 2011/0153684 A1 | 6/2011 | Yung | |
| 2016/0197835 A1* | 7/2016 | Luft | H04L 67/327 |
| | | | 709/223 |
| 2017/0373935 A1* | 12/2017 | Subramanian | G06F 9/4856 |
| 2018/0359323 A1* | 12/2018 | Madden | H04L 67/51 |
| 2021/0158232 A1* | 5/2021 | Bolt | G06Q 10/04 |
| 2022/0038902 A1* | 2/2022 | Mueck | G06F 21/57 |

\* cited by examiner

US 11,671,429 B1

AUTHORIZATION AUTOMATION IN PROCUREMENT OF INTERCONNECTIONS WITHIN A DATA CENTER

TECHNICAL FIELD

This disclosure generally relates to interconnections between customer networks within a data center.

BACKGROUND

A network services exchange provider or co-location provider (a "provider") may employ a communication facility, such as a data center or warehouse, in which multiple customers of the provider locate network, server, and storage gear and interconnect to a variety of telecommunications and other enterprises and service provider(s) with a minimum of cost and complexity. Data centers may be shared by the multiple customers. With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility includes an interconnection system that provides interconnection services by which customers of the provider may interconnect to one another over the interconnection system infrastructure or by which a customer of the provider may interconnect its spatially and/or geographically distributed customer networking equipment over the communication facility infrastructure. The communication facility may in such cases be referred to as an "interconnection facility" or "co-location and interconnection facility." The provider may provide services accessible to co-located customers via an interconnection, such services including, for example, a cloud exchange, Internet access, an Internet exchange, "metro connect" for reaching other communication facilities within a metropolitan area, a cross-connect from one customer to another, and other interconnection services. Interconnections may represent connections between customer networks for inter-customer interconnections (between different customers) or intra-customer interconnections (between areas of an interconnection center(s) that are operated/leased by a single customer).

SUMMARY

In general, the present disclosure describes techniques for performing automatic order parameter validation and workflow simplification of an online procurement process for interconnections between computing systems for multiple customers co-located within a data center. A data center provider provides an online procurement system by which customers can request interconnections. In some examples, the online procurement system receives Z-side parameters for a connection between a Z-side customer and an A-side customer. The online procurement system may automatically validate the Z-side parameters against a data center provider by integrating with backend systems that describe available Z-side assets (e.g., interconnections) and verifying and confirming the availability of Z-side assets identified by the Z-side parameters.

In some examples, the online procurement system receives Z-side parameters for a connection between a Z-side customer and an A-side customer. The online procurement system may generate an order for the connection and, as part of generating the order, generate a key that uniquely identifies the Z-side parameters for the connection. To proceed with an order for the connection, the online procurement system sends an indication of the key to the A-side customer, which can then send, along with the key, an indication of accepting the order for the connection. In some examples, the online procurement system sends the indication of the key to the A-side customer by providing a uniform resource locator (URL) that the A-side customer can invoke to indicate to the online procurement system the acceptance of the order for the connection. The online procurement system may map the key to the Z-side parameters for the connection and trigger an operations team to create a connection between the A-side customer and the Z-side customer, where the Z-side of the connection conforms to the Z-side parameters identified by the key.

The techniques may provide one or more technical advantages or improvements that provide at least one practical application. In the conventional procurement process, the language used in order information (e.g., a physical Letter of Authorization or 'LOA') is not standardized, requiring human oversight at least twice in the process. To illustrate, human oversight is required when a Z-side provider sends such ordering information to an A-side customer. Human oversight is required a second time when the A-side customer presents such order information for authorization or denial. The nature of the order information itself adds to the complexity of the subject order. This information contains details about the Z-side parameters (e.g., cage, cabinet, interconnection, patch panel, etc.) indicating where and how a connection is to be made on the Z-side. The order information is often very technical, which does not lend itself to easy comprehension especially when non-standardized language is used. These problems have an impact on customers, cloud service providers, and the data center provider. A-side customers and Z-side customers may be frustrated due to delay in order fulfilment and data center operation teams are frustrated due to duplicate efforts.

The techniques may reduce human intervention and/or steps in the workflow for procuring a connection between customers of the data center provider. Because the conventional procurement of such computing services is a manual process, there are a number of inefficiencies on both the A-side and the Z-side. More importantly, errors could be introduced at any point in the procurement process. As a worst-case scenario, the data center may reject one or more orders in error and delay other orders. By internally managing the details typically found in a physical Letter of Authorization and shepherding the acceptance and validation processes, in accordance with the techniques described herein, the data center provider may facilitate less complex and troubled connection acceptance, faster connection acceptance and order fulfillment, and in this way promote higher customer satisfaction.

In one example, this disclosure describes a method comprising: obtaining, by a computing device operated by a data center provider for a data center, from a first customer of the data center provider, order information comprising a set of parameters defining an interconnection within the data center between a first customer network of the first customer and a second customer network of a second customer of the data center provider, wherein the first customer network and the second customer network are co-located in the data center; sending, by the computing device to the second customer, a communication comprising a unique identifier that maps to the set of parameters; and outputting, by the computing device, an indication of authorization for the interconnection based upon an authorization directive from the second customer, the authorization directive comprising the unique identifier.

In another example, this disclosure describes a computing device operated by a data center provider for a data center, the computing device comprising processing circuitry coupled to memory and operative to execute logic that causes the processing circuitry to: obtain from a first customer of the data center provider, order information comprising a set of parameters defining an interconnection within the data center between a first customer network of the first customer and a second customer network of a second customer of the data center provider, wherein the first customer network and the second customer network are co-located in the data center; sending, to the second customer, a communication comprising a unique identifier that maps to the set of parameters; and outputting an indication of authorization for the interconnection based upon an authorization directive from the second customer, the authorization directive comprising the unique identifier.

In another example, this disclosure describes a non-transitory computer-readable medium comprising instructions comprising: obtaining, by a computing device operated by a data center provider for a data center, from a first customer of the data center provider, order information comprising a set of parameters defining an interconnection within the data center between a first customer network of the first customer and a second customer network of a second customer of the data center provider, wherein the first customer network and the second customer network are co-located in the data center; sending, by the computing device to the second customer, a communication comprising a unique identifier that maps to the set of parameters; and outputting, by the computing device, an indication of authorization for the interconnection based upon an authorization directive from the second customer, the authorization directive comprising the unique identifier.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
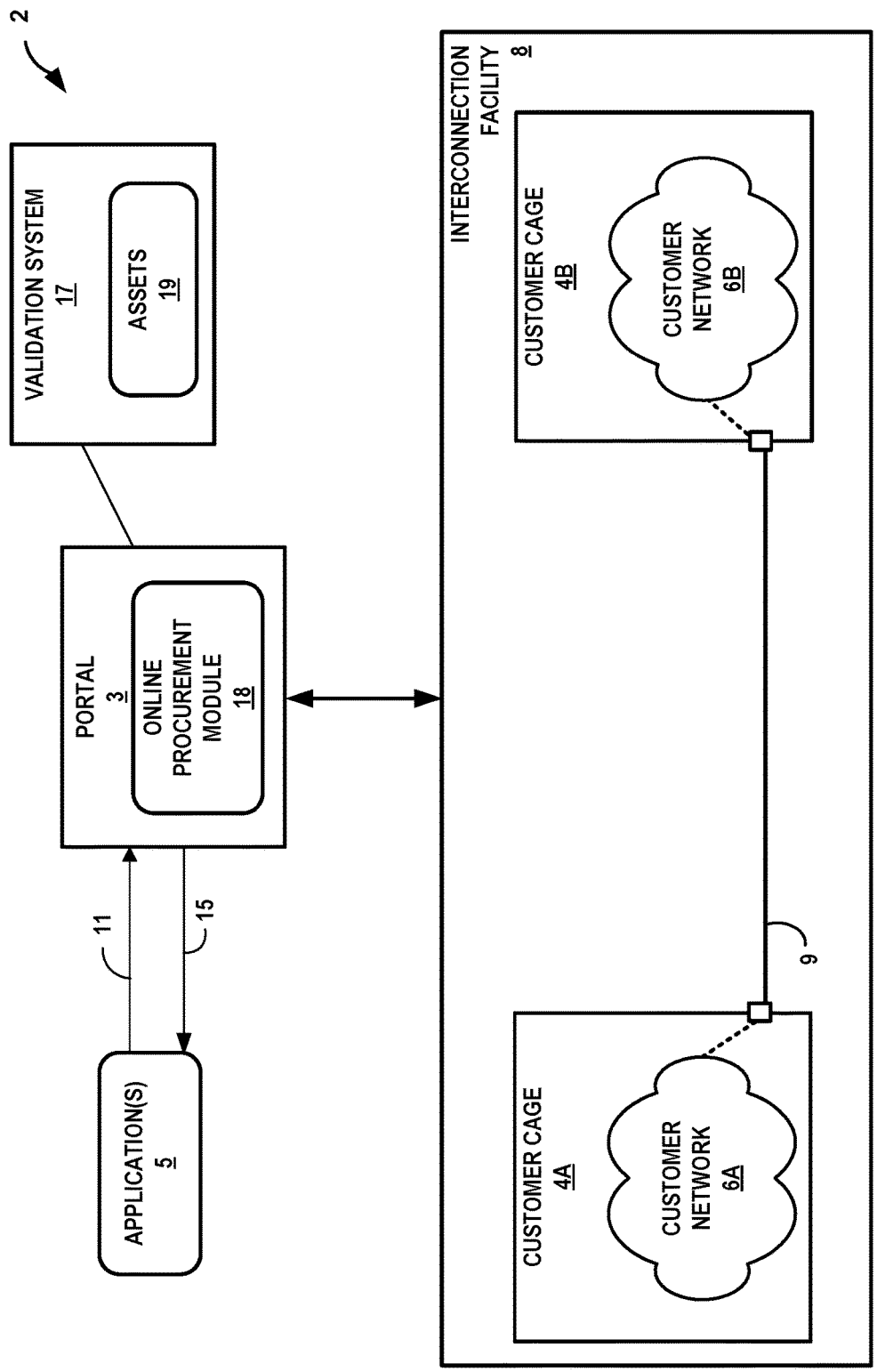
FIG. 1 is a block diagram that illustrates a high-level view of an interconnection system that offers an automated online procurement process for interconnections between customer networks in a data center interconnection facility in accordance with techniques described herein.

FIG. 1 is a block diagram that illustrates a high-level view of an interconnection system 2 having a portal 3 that offers portal-based interconnection ordering and automated interconnection procurement and services provisioning to a customer of an interconnection facility in accordance with techniques described herein. Interconnection system 2 depicts an interconnection facility 8 operated by an interconnection system provider, the interconnection facility 8 having an network switch fabric configurable for interconnecting customer networks 6A-6B (collectively, "customer networks 6") located within multiple customer cages 4A-4B (collectively, "customer cages 4"). In some instances, each of customer cages 4 may be associated with a different customer of the interconnection system provider.

A customer may request, from the provider, a connection between its computing system to a computing system of another customer within a data center. The computing system of requesting customer is often termed the "A-side" of the connection while the computing system of the other customer is often termed the "Z-side" of the connection, particularly where the Z-side customer is a network service provider or cloud service provider. As part of a request for the connection, the A-side customer may include a letter of authorization (LOA) that the A-side customer has received from the Z-side customer. The LOA indicates authorization for the connection from the Z-side customer and includes parameters for creating a connection to the Z-side computing system. Such parameters are Z-side parameters may specify the Z-side customer's desired cage, cabinet, interconnection, patch panel, connection type, or other resources associated with the Z-side customer and the connection.

Before sending the LOA to the A-side customer for a prospective connection requested by the A-side customer to receive network or computing services, e.g., from the Z-side customer system, the Z-side customer may determine prospective Z-side parameters and send the prospective Z-side parameters to the provider in a document for manual review by a data center operations team. The operations team can test the resources specified by the Z-side parameters to ensure availability, suitability, and—in some cases—operability for a new connection. The provider returns an indication of whether the testing was successful to the Z-side customer. If successful, the Z-side customer generates an LOA and sends the LOA to the A-side customer, which sends the LOA to the provider with the request for the connection. The LOA document is typically a document in a portable document format (PDF).

The data center operations team for the provider receives the LOA and request for connection, which may also include A-side parameters that specify the A-side customer's resources to use with the connection. The operations team creates the connection between the A-side and the Z-side according to the LOA and the request for connection.

As used herein, the term "customer" of the interconnection system provider may refer to a tenant of the interconnection facility 8 deployed by the interconnection system provider, whereby the customer leases space within the interconnection facility 8. The customer may do so in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity. Customer networks 6 may each include network equipment and form an L2, L3, or L2/L3 network. Customers of the interconnection system provider may include enterprises, network service providers, managed service providers, resellers, cloud service providers, and wholesalers, for instance.

In the interconnection facility 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the interconnection facility 8 or, e.g., another interconnection facility managed by the interconnection facility provider. Although illustrated and primarily described with respect to customer cages 4 in interconnection facility 8, the techniques of this disclosure are similarly applicable for provisioning network switch fabric 10 ports for customer equipment distributed within an interconnection facility 8 (or distributed interconnection facilities) in various space factors, such as those identified above.

Each of cages 4 are installed by the interconnection system 2 provider and provide a secure structure and location for a customer to store and access their customer network, while also having access to optical network infrastructure 10, e.g., via a customer side of a patch panel (not shown) situated within the cage 4 mesh that defines a cage boundary or "demarcation" within the interconnection facility, in that the customer alone has access to the cage interior. Such patch panels (more simply and hereinafter, "panels") may also provide the interconnection system 2 provider with convenient and secure access to a provider side of the panels. For example, the provider may be able to access the provider-sides of panels for cages 4 without accessing the interior of cages 4. Likewise, the customers leasing or otherwise having access to the interiors of cages 4 may be able to access the customer sides of panels but may be prevented from accessing the provider sides of panels. In some examples, the provider may able to access a secure hallway between cages 4, which may allow access to the provider side of the panels.

An example customer network may include, as networking infrastructure, network switch fabric including, e.g., layer 3 (L3) and layer 2 (L2) forwarding elements, which may include one or more routers, switches, and other L3/L2 forwarding devices. Interconnection facility 8 may include one or more real servers that offer one or more compute/computing farms that offer services to customers associated with the above-mentioned cages and/or apply services to service traffic via such network switch fabric. Network switch fabric may be configured to provide interconnection services to customer networks 6 for a customer, e.g., a carrier/NSP, customer, cloud service provider, or cloud service customer, via interconnection 9.

More specifically, interconnection 9 may be configured to allow direct exchange of network traffic between the customer network 6A in customer cage 6A and the customer network 6B in customer cage 4B to enable interconnection services provided by the interconnection facility 8.

Interconnection system 2 further includes a portal 3, alternatively referred to herein as an "interconnection platform." Portal 3 may expose a software interface that defines the commands, methods, fields, and/or other software primitives by which application(s) 5 may invoke online procurement module 18 to submit orders and receive indications of order completion. In this way, portal 3 may enable customers and/or the interconnection system 2 provider itself with the capability of requesting and ordering an interconnection with a customer via a graphical user interface (GUI) or other application.

Portal 3 may represent an application executing on a computing system within one or more data centers of system 2 or alternatively, off-site/remotely at a back office or branch of the interconnection system 2 provider, for instance. Although shown as administering a single interconnection facility 8, portal 3 may control facilitate interconnection ordering for multiple different interconnection facilities. Alternatively or additionally, multiple separate instances of portal 3 may facilitate interconnection ordering for respective multiple different interconnection facilities.

Application(s) 5 represents at least one application that communicates with portal 3 to request an interconnection for a customer. Application(s) 5 represent client-side software for interfacing with portal 3 and may include a browser operating system component, a customer application (e.g., third-party application), a thin-client interface for online procurement module 18, an interconnection system 2 provider application that is accessible only to interconnection facility 8 operators, and/or a console such as a command-line interface or graphical user interface (GUI). Users or clients of application(s) 5 may include enterprise systems, cloud service and content providers, carriers, network service providers (NSPs), and/or the interconnection system provider itself, for instance. In some cases, application 5 and portal 3 may represent different functions or modules of the same application.

A user, such as a customer, enters order information for an interconnection (e.g., a physical connection) via an interface of an application of application(s) 5. The order information may include a set of parameters defining a desired interconnection for the customer networks 6. In general, the set of parameters includes data identifying resources to be used as components for creating the interconnection. These parameters represent the requesting customer's desired interconnection.

Upon submission of the order information, the application of application(s) 5 issues, to portal 3, an order 11 that specifies one or more of the above-mentioned parameters for defining an interconnection 9 between customer networks within interconnection facility 8. Order 11 may further specify, for instance, a start date at which the interconnection should be operational, an end date at which the interconnection should be taken down (potentially indefinite until the contract term expires), identifiers for a cage/suite and a cabinet housing a customer network (e.g., customer network 6A), identifiers for panel components at demarcation panels of a customer cage (e.g., customer cage 4A), an identifier or location for interconnection facility 8 (e.g., metropolitan area and data center name), a connection service/type (e.g., Multi-Mode Fiber, COAX, POTS, Single-Mode Fiber and UTP), a media type, an interconnection form factor/model (e.g., RJ45, optical form-factor), a physical layer standard/protocol (e.g., GigE, SONET/SDH), and other interconnection configuration parameters. Patch components may each represent a demarcation point between the customer network and the interconnection system 2 provider. Interconnection 9, e.g., may represent an interconnection between network interface cards, dense interconnection concentrators (DPCs) or other line cards, or other ports to exchange packets over wired communications (e.g., via a physical cable).

In response to receiving order 11 for an interconnection and in accordance with the set of parameters, online procurement module 18 confirms an appropriate, available set of resources for use as interconnection components to satisfy order 11. In some examples, online procurement module 18 of portal 3 communicates order 11 to dedicated personnel in interconnection facility 8 who proceed to perform various validation operations with respect to the set of parameters. One or more persons may manually examine the parameters for order 11 for correctness while one or more other persons may manually examine components within interconnection facility 8 to determine if those components can be used for the interconnection fulfilling order 11.

In other examples, portal 3 provides access to a software environment with programs that automate the above-mentioned manual examinations. In one example, portal 3 determines that a connection point (e.g., a port) to customer network 6A and connection point (e.g., a port) to customer network 6B is not in use or reserved and is thus available to satisfy interconnection order 11. Portal 3 may further determine that, among the available interconnections of network switch fabric 10, interconnection 9 is a shortest distance to the customer cage 4A panel or is otherwise the most optimally located for interconnection ordering and provisioning, and portal 3 may select interconnection 9 on this basis for interconnection order 11. As referred to herein, a port means a physical port on a computer system or part thereof, such as a server, a router, a patch panel, or on a connector, to which a cable may be connected to enable wired transmission of data.

Online procurement module 18 may further determine that the interconnection components fail to meet, meet, or exceed the requested parameters (e.g., bandwidth) indicated in interconnection order 11. To determine the appropriate, available interconnection, portal 3 may query a database of interconnection assets 19 that stores records indicating a status and parameters of interconnections within interconnection facility 8. If no interconnection is available to satisfy interconnection order 11, portal 3 may reply to interconnection order 11 with an order rejected message or a suggestion for an available interconnection with different parameters, for example. An example query for the database of interconnection assets 19, online procurement module 18 may communicate a request for information indicating availability of resources for use as components in creating an interconnection to satisfy interconnection order 11. If there is an interconnection to satisfy interconnection order 11, online procurement module 18 generates a unique identifier for the set of parameters defining that interconnection and communicates (e.g., in a message) the unique identifier to a second customer.

In response to identifying an appropriate, available interconnection, online procurement module 18 may reserve the interconnection and in some case may generate a cross-connect task. Based on the cross-connect task, a technician may then provision a physical interconnection 9 between customer cage 4A and customer cage 4B. Interconnection 9 represents a physical cable (such as a CAT5/6, coax, or optical fiber cable). Upon provisioning the physical interconnection 9, the technician may then mark the cross-connect task as completed via an operator interface output by portal 3. In response to determining the cross-connect task is complete, portal 3 may provision services for the interconnection 9 according to interconnection products requested by the customer to be provided via interconnection 9 in the order 11. As another option, portal 3 may automatically configure additional networking infrastructure (e.g., ports, connectors, and network additional interconnections (e.g., virtual circuits)) over interconnection 9 according to order 11.

In some examples, portal 3 further determines that a port is active ("lit") before configuring the interconnection. In some examples, PNP further determines that both a port of customer cage 4A and a port of customer network 6A are active/lit before configuring the interconnection.

To order interconnection 9, portal 3 may direct, via SNMP or a software-defined networking (SDN) protocol, interconnection facility 8 to test/validate order 11 parameters and if successfully validated, to configure interconnection 9 in accordance with the requested parameters of order 11 (e.g. bandwidth).

Interconnection 9 may represent a Layer 0 ("L0") connection in that a physical cross-connect underlies the Open Systems Interconnection (OSI) model or TCP/IP model for packet networking. In particular, interconnection 9 may underlie an optical transport network (OTN) layer that (typically in conjunction with a SONET/SDH layer) provides Layer 1 ("L1") connectivity between optical networking devices such as wavelength division multiplexing (WDM) devices or may underlie an Ethernet layer that provides L1 connectivity.

Interconnection 9 may in some cases underlie a layer 2 ("L2") or layer 3 ("L3") service provided by the interconnection system 2 provider to interconnect customer cages 4A, 4B. For example, interconnection facility 8 may operate a network services exchange, such as Ethernet Exchange, and Internet Exchange, and/or a Cloud Exchange, and each of these may make use of interconnection 9 to transmit L2/L3 protocol data units (PDUs) between customer networks 6A, 6B. Interconnection facility 8 may provide any combination of the above described products and services, in various examples.

Further example details of a facility that provides a cloud-based services exchange are found in U.S. patent application Ser. No. 15/099,407, filed Apr. 14, 2016 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 15/001,766, filed Jan. 20, 2016 and entitled "Multi-cloud, Multi-service Data Model." Further example details of a facility that provides a carrier Ethernet exchange are found in U.S. Pat. No. 8,537,845 entitled "REAL TIME CONFIGURATION AND PROVISIONING FORA CARRIER ETHERNET EXCHANGE," filed Sep. 13, 2012. Each of the above patents and patent applications are incorporated herein by reference in their respective entireties.

Online procurement module 18 may receive an indication from interconnection facility 8 that interconnection 9 is successfully configured. Once online procurement module 18 determines that interconnection 9 has been successfully configured and is ready to deliver the requested services, portal 3 notifies the customer that interconnection 9 is ready for acceptance and use by sending a interconnection order success response message 15. Portal 3 may automatically provision interconnection 9 for service delivery in response to determining that interconnection 9 is successfully configured. The customer may thereafter configure customer network 6A to begin exchanging packets with customer network 6B via interconnection 9. In this way, the interconnection system 2 may streamline interconnection ordering and reduce interconnection configuration and interconnection services provisioning times.

Online procurement module 18 or another module in portal 3 may further provision interconnection 9 to deliver interconnection services. For example, interconnection 9 may be configured with corresponding private connections ("virtual circuits") that may be implemented using L2VPNs or IP-VPNs configured in network switch fabric 10. In this way, portal 3 may automatically provision virtual circuits for service delivery in response to determining that interconnection 9 is available (i.e., attached).

Figure 2:
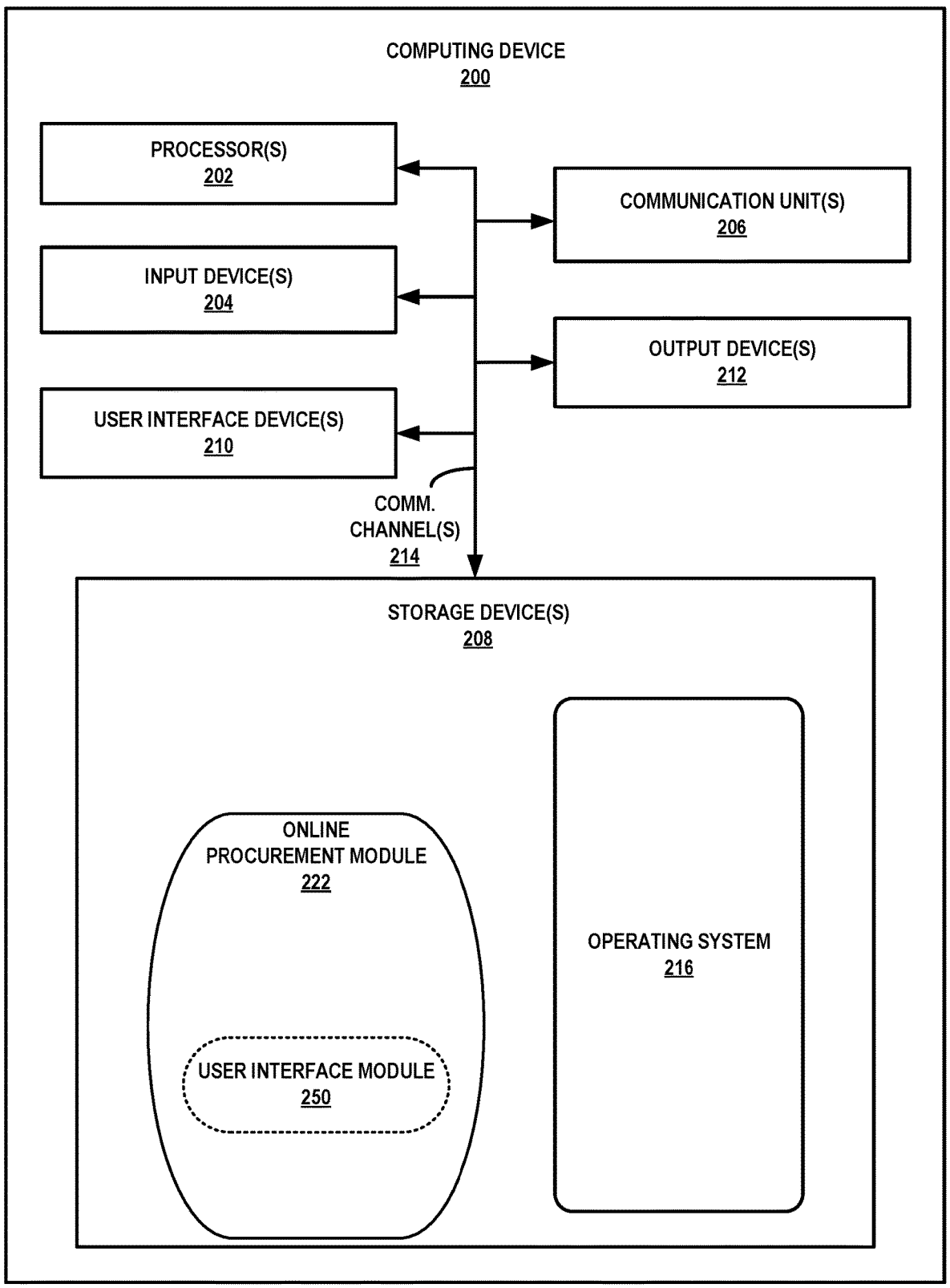
FIG. 2 is a block diagram illustrating further details of one example of a computing device that operates in accordance with one or more techniques of the present disclosure.

FIG. 2 may illustrate a particular example of a server or other computing device 200 that includes one or more processor(s) 202 for executing any one or more of an ordering system, or any other computing device described herein, in accordance with one or more techniques of the disclosure. Computing device 200 of FIG. 2 is described below as an example of one of computing devices in interconnection system 2 of FIG. 1. FIG. 2 illustrates only one example of computing device 200, and many other examples of computing device 200 may be used in other instances and may include a subset of the components included in computing device 200 or may include additional components not shown in computing device 200 of FIG. 2.

Although shown in FIG. 2 as a stand-alone computing device for purposes of example, computing device 200 may be any component or system that includes one or more processors or other suitable computing environment for executing software instructions and, for example, need not necessarily include one or more elements shown in FIG. 2 (e.g., communication units 206; and in some examples components such as storage device(s) 208 may not be co-located or in the same chassis as other components).

Operating as a point of entry for customers to access one or more data centers having their customer networks, such as in interconnection facility 8 of FIG. 1, computing device 200 may be a remote proxy server or a local server within a data center offering customers interconnection services, such as a cloud exchange, an Ethernet exchange, an Internet exchange, or cross-connections. In this example, computing device 200 is operated by a data center provider for the data center, which includes a set of interconnected computing devices to support the operations of data center. As described above, the data center may include customer networks that are interconnected via physical equipment (e.g., cables) provided by one or more tiers of physical network switches and routers.

As shown in the example of FIG. 2, computing device 200 includes one or more processors(s) 202, one or more input devices 204, one or more communication units 206, one or more storage devices 208, one or more user interface devices 210, one or more output devices 212. Communication channel(s) 214 may interconnect each of the components 202, 204, 206, 208, 210, and 212 for inter-component communications (physically, communicatively, and/or operatively). In some examples, communication channel(s) 215 may include a system bus, a network connection, an inter-process communication data structure, or any other method for communicating data.

One or more communication units 206 of computing device 200 may communicate with external devices, such a customer computing device from which interconnection orders are submitted, via one or more wired and/or wireless networks by transmitting and/or receiving network signals on the one or more networks. Examples of communication units 206 include a network interface card (e.g. such as an Ethernet card), an optical transceiver, a radio frequency transceiver, a GPS receiver, or any other type of device that can send and/or receive information. Other examples of communication units 206 may include short wave radios, cellular data radios, wireless network radios, as well as universal serial bus (USB) controllers.

One or more input devices 204 of computing device 200 may receive input. Examples of input are tactile, audio, and video input. Input devices 204 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input devices 204 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output devices 212 of computing device 200 may generate output. Examples of output are tactile, audio, and video output. Output devices 212 of computing device 200, in one example, includes a PSD, sound card, video graphics adapter card, speaker, cathode ray tube (CRT) monitor, liquid crystal display (LCD), or any other type of device for generating output to a human or machine.

Processors 202, in one example, are configured to implement functionality and/or execute instructions for computing device 200. Examples of processors 202 may include, any one or more of a microprocessor, a controller, a digital signal processor (DSP), an application specific integrated circuit (ASIC), a field-programmable gate array (FPGA), or equivalent discrete or integrated logic circuitry. Processors 202 include processing circuitry assembled into application processors, display controllers, auxiliary processors, one or more sensor hubs, and any other hardware configure to function as a processor, a processing unit, or a processing device. Various software programs may be operable by processors 202 to perform various actions, operations, or functions of computing device 200. For example, processing circuitry of computing device 200 may retrieve and execute instructions stored by storage device(s) 208 that cause processors to perform the operations of operating system 216. The instructions, when executed by processors 202, may cause computing device 200 to store information within storage device(s) 208.

Online procurement module 222 may also include program instructions and/or data that are executable by computing device 200. Online procurement module 222 may include one or more software programs such as user interface module 250, which is illustrated with dashed lines to indicate that these may or may not be executable by any given example of computing device 200.

Storage device(s) 208 within computing device 200 may store information for processing during operation of computing device 200 (e.g., computing device 200 may store data accessed by online procurement module 222 during execution at computing device 200). In some examples, a storage device of storage devices 208 include temporary memory, meaning that a primary purpose of that storage device is not long-term storage. That storage device may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage device(s) 208, in some examples, also include one or more computer-readable storage media. Storage device(s)

208 in some examples include one or more non-transitory computer-readable storage mediums. Storage device(s) 208 may be configured to store larger amounts of information than typically stored by volatile memory. Storage device(s) 208 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device(s) 208 may store program instructions and/or information (e.g., data) associated with online procurement module 222.

Computing device 200 may operate as a server and that server is communicably coupled to client computing devices running applications that coordinate interconnection ordering and service provisioning with online procurement module 222; each of these applications may represent a web portal, a console, a thin-client interface, a stand-alone application, an operator portal, a customer portal, or other application by which a customer may request services, request assets, request information regarding existing services or assets, and so forth. In general, an example application is configured to present, on a display device, a graphical user interface (GUI) that accepts, as input, order information for an interconnection and produces, as output, indications of authorizations or rejections of that interconnection order. The example application may be further configured to package the order information into a command or function call for online procurement module 224 and to process certain messages from online procurement module 224 into content for presentation on the GUI.

In one example, the customer submits, via the GUI presented by any one of the above-mentioned applications, an order for an interconnection between that (first) customer's network in a data center and another (second) customer's co-located network. Such an order includes requisite order information in the form of a set of parameters defining the first customer's desired interconnection. As mentioned herein, the interconnection may refer to a physical connection (e.g., between both networks to enable wired communications of data between the customers. As an option, the first customer may submit, via the same GUI or another GUI of another application, the set of parameters for validation by an internal validation system managed by the same customer.

Once (validated and) submitted to computing device 200, online procurement module 222, in turn, obtains the order information comprising the set of parameters from memory in storage device(s) 208 and submits the set of parameters for validation by a validation system that operates in a data center. By validating the set of parameters, the validation system confirms that the data center includes components necessary for creating the interconnection. In response to the validation of the set of parameters, online procurement module 222 may generate a unique identifier that maps to the set of parameters. The unique identifier may operate as an index in a database storing previous interconnection orders (e.g., assets database) where each database record stores parameters for each previous interconnection order. In this capacity, the unique identifier operates as a replacement for a Letter of Authorization (LOA), which was mandatory for conventional interconnection procurement processes.

Online procurement module 222 proceeds to send the second customer a communication having the above-mentioned unique identifier. This communication may be a message (e.g., in email form) with text indicating the unique identifier as a representation of the set of parameters defining the first customer's desired interconnection in the data center. In some examples, the text may include a uniform resource locator (URL) that also operates as an address pointing to a storage location for the order information comprising the set of parameters. The URL may be a link to a corresponding database record in the above-mentioned database storing records of previous interconnection orders. The second customer may use an application—similar to the application used by the first customer—to view the order information as content in a GUI. Such an application may present the same GUI as the application used by the first customer, a different GUI provided by online procurement module 222, or a different GUI altogether. In any case, the second customer enters, via the GUI of the application, the unique identifier and then, receives, from online procurement module 222, content presenting the order information comprising the set of parameters. After examining the set of parameters for acceptability, the second customer determines whether to authorize or reject this pending interconnection order and communicates, via the GUI of the application, a control directive that is either an authorization directive or a rejection directive.

When online procurement module 222 receives the above-mentioned control directive, online procurement module 222 performs one or more actions in response, such as outputting an indication of authorization if the control directive is an authorization directive. Otherwise, the control directive is a rejection directive and online procurement module 222, in response, outputs an indication of rejection. Output device(s) 212 may generate, for display to the first customer, content presenting either the indication of authorization or rejection. In some examples, online procurement module 222 generates a communication comprising the indication of authorization or rejection and that communication, when received by the first customer, is presented on the GUI at the first customer's computing device.

In some examples where the control directive is an authorization directive, online procurement module 222 proceeds to reserve the one or more components corresponding to the set of parameters. Online procurement module 222 may instruct (e.g., via a suitable communication protocol) the data center to effectuate the reservation of the one or more components. As an alternative, online procurement module 222 may, prior to sending the unique identifier, reserve the one or more components corresponding to the set of parameters in anticipation of the authorization directive. In other examples, online procurement module 222 may instruct the data center to create the desired interconnection using components in accordance with the order information comprising the set of parameters.

As described herein, the set of parameters may provide information identifying an interconnection facility (i.e., IBX), a cage or suite, a cabinet, and other information corresponding to a location of a cage housing a customer network such as cage 4A and customer network 6A. The set of parameters may provide information specifying components for creating the desired interconnection in interconnection facility 8, such as a connection service and/or a media type. The connection type/service may refer to cable type such as Multi-Mode Fiber, coaxial electrical cable or COAX, Plain Old Telephone Service (POTS), Single-Mode Fiber and UTP. The set of parameters may include parameter data identifying additional location information for the interconnection. Such parameter data may indicate connection points on the customer networks 6 for configuring the connection service of the interconnection. One example parameter indicates a patch panel and/or a physical port for attaching a cable of the interconnection.

Another parameter that may be included in the set of parameters specifies a data provider service (e.g., an interconnection service) to operate on the interconnection being ordered. The data center provider may provide services accessible to co-located customers via the interconnection, such services including, for example, a cloud exchange, Internet access, an Internet exchange, "metro connect" for reaching other communication facilities within a metropolitan area, a cross-connect from one customer to another, and other interconnection services.

Figure 3:
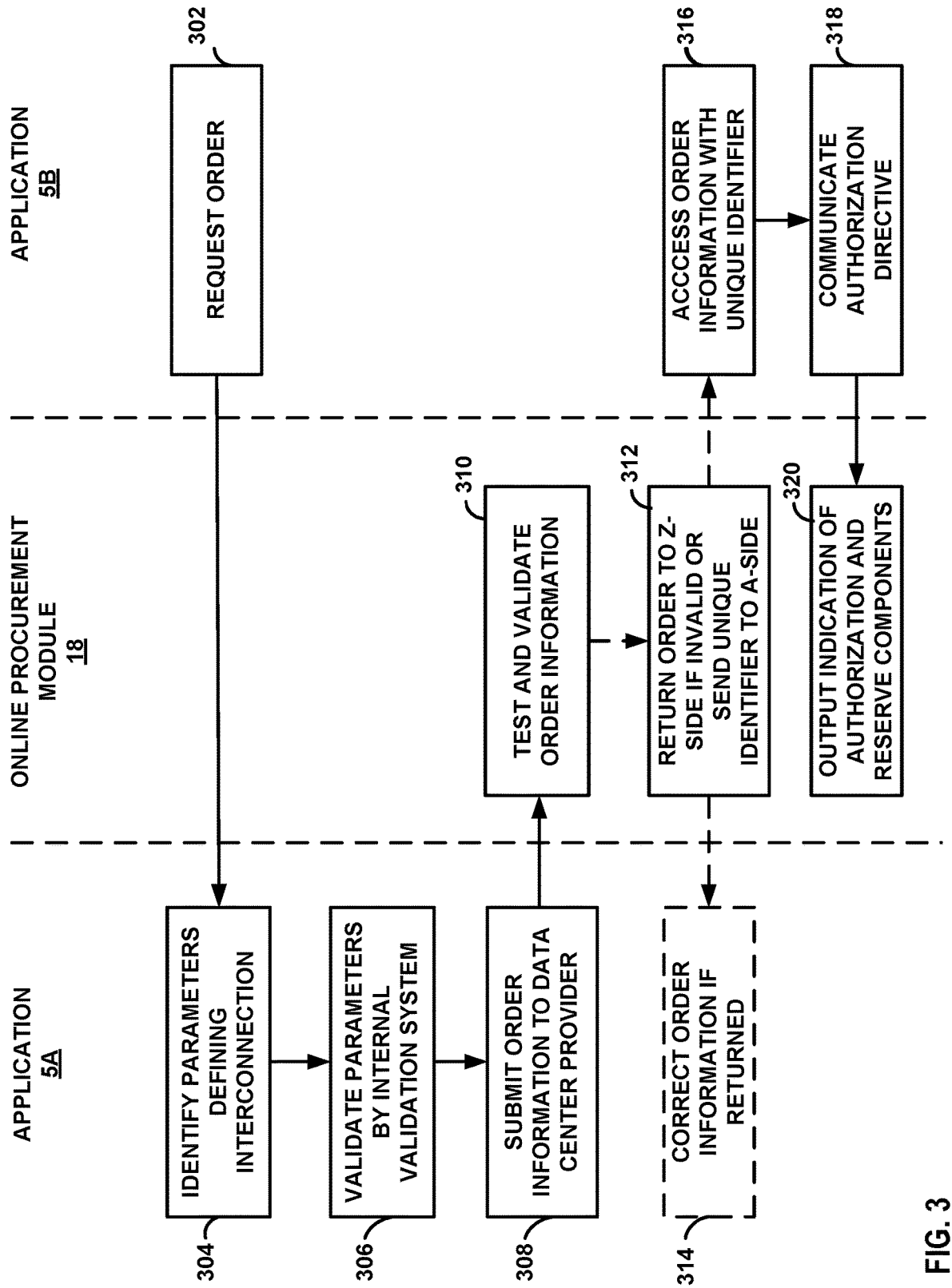
FIG. 3 is a flowchart illustrating an automated online procurement process for an interconnection facility, according to techniques described in this disclosure.

FIG. 3 is an interaction diagram illustrating an automated online procurement process for an interconnection facility, according to techniques described in this disclosure. For convenience, FIG. 3 is described with respect to FIGS. 1 and 2.

Application 5A represent a Z-side customer system and application 5B represents an A-side customer system, each of applications 5A-5B being examples of application 5 of FIG. 1. In the example of FIG. 3, processing circuitry executes application 5A of Z-side customer of a data center provider, such as the interconnection facility 8 provider of FIG. 1, being managed by a computing device, such as computing device 200 executing online procurement module 18. The processing circuitry executing application 5A may generate for presentation to the Z-side customer a GUI having GUI components that accept input for the data center provider and produce output from the data center provider. Further in the example of FIG. 3, other processing circuitry executes application 5B of A-side customer of the data center provider. Similar to the Z-side customer, the A-side customer may view, via a GUI of application 5B, content on GUI components that accept input for the data center provider and produce output from the data center provider.

The processing circuitry executing application 5B communicates an order request from the A-side customer to the processing circuitry executing application 5A for presentation to the Z-side customer (302). The processing circuitry executing application 5A receives the order request and, in turn, identifies parameters defining an interconnection as described herein (304). The processing circuitry executing application 5A proceeds to have the parameters examined and validated by an internal validation system (306). In some examples, the internal validation system determines whether the parameters correspond to actual assets owned/leased by the Z-side customers. Once the parameters are validated, the processing circuitry executing application 5A submits order information to a data center provider (308).

Processing circuitry executing online procurement module 18 receives the order information including the parameters defining the interconnection and proceeds to test and validate the order information (310). In some examples, online procurement module 18 leverages a validation system within the data center to identify resources corresponding to the parameters and to determine whether those resources can be used as components for creating the desired interconnection. The validation system may further determine whether the desired interconnection is even technically feasible, for example, in terms of operability and compatibility amongst the components. The validation system may further determine whether the desired interconnection is capable of its expected functionality, for example, with respect to a desired service such as an interconnection service. A data center operations team, an alternative to the validation system, may manually examine data center resources to determine if the desired interconnection is feasible.

The processing circuitry executing online procurement module 18 either returns, to the Z-side customer, the order information if invalid or sends to the A-side customer a unique identifier mapping to the order information if valid (312). As an option, the processing circuitry executing application 5A may correct the invalid order information if returned (314). The processing circuitry executing application 5B may use the unique identifier to access the order information (316). As described herein, application 5B may use a graphical user interface (GUI) representing portal 3 of FIG. 1 for communicating input to and processing output from online procurement module 18. The GUI may be generated by online procurement module 18 (e.g., via the user interface module 250 of FIG. 2), application 5B, or both online procurement module 18 and application 5B. The A-side customer enters, into a component of the GUI, the unique identifier and the processing circuitry executing application 5B communicates a request having the unique identifier and receives content for presentation of the order information that is mapped to the unique identifier. If acceptable to the A-side customer, the processing circuitry executing application 5B communicates an authorization directive to online procurement module 18 (318).

The processing circuitry executing online procurement module 18 receives a message comprising the authorization directive and executes the interconnection order. The processing circuitry executing online procurement module 18 proceeds to output an indication of authorization to a device in the data center managed by the data center provider and reserve components for creating the interconnection in the data center (320). With authority of the data center provider, the processing circuitry executing online procurement module 18 may instruct data center operators to place a hold on resources corresponding to the interconnection components and attach necessary physical components (e.g., cables) to connection points to the Z-side's customer network and the A-side's customer network in a manner that conforms to the parameters of the Z-side and other order parameters, coupling these customer networks to enable wired communications. The processing circuitry executing application 5B may output (e.g., via the user interface module 250 of FIG. 2) content describing the authorized interconnection order.

Figure 4:
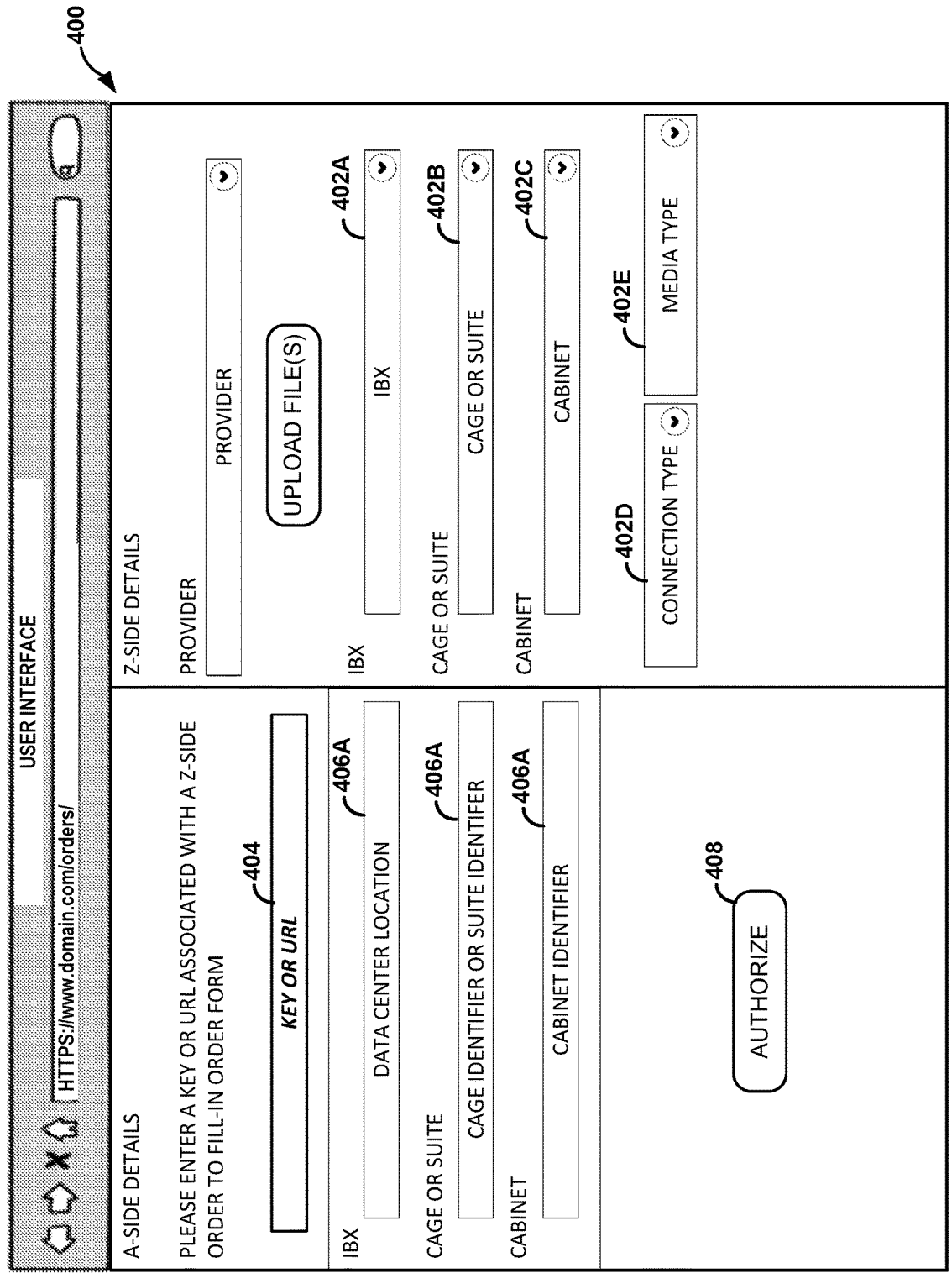
FIG. 4 is an illustration depicting an example user interface with which a customer views an order of an interconnection within a data center, in accordance with one or more techniques of the present disclosure.

FIG. 4 is an illustration depicting an example user interface 400 with which a customer views an order of an interconnection within a data center, in accordance with one or more techniques of the present disclosure. With one user interface 400, a first customer may initiate the order (e.g., as a Z-side customer) while a second customer authorizes the order (e.g., as a A-side customer). In this manner, a given a data center customer be both roles with respect to interconnections within a data center.

Example user interface 400 may be a graphical user interface (GUI) generated by online procurement module 18, application 5B, or both online procurement module 18 and application 5B. In general, a GUI includes a plurality of GUI components of which some GUI components are sub-components of other GUI components. GUI components of example user interface 400 present content to be used by customers (e.g., both A-side and Z-side customers) for ordering interconnections in a data center managed by a data center provider.

As illustrated, example user interface 400 includes GUI components 402A-C that are configured to receive, as input for online procurement module 18, the set of parameters defining a desired interconnection between a first customer and a second customer of the data center managed by the data center provider. The first customer may be a Z-side customer while the second customer is an A-side customer. GUI components 402A-E are included in a partition (e.g., a HMTL frame or another container) of example user interface 400 dedicated to Z-side customer details. GUI components 402A-E are depicted in FIG. 4 as HTML elements known as drop down boxes, each presenting a list of options for selection as IBX location, cage or suite identifier, and cabinet identifier, connection type or service, and media type. Instead of communicating any of these parameters to the second customer, which is an A-side customer, online procurement module 18 communicates a unique identifier that maps to a storage location (e.g., a database record) having the set of parameters.

The present disclosure describes a number of example parameters to be used in defining the desired interconnection. In general, the set of parameters include parameter data describing components for physical equipment to be used in, for example, creating the desired interconnection in the data center. One type of parameter data identifies a location, in each customer's network (e.g., A-side or Z-side customer network), of a connection point for coupling physical equipment (e.g., a cable) connecting both customers' networks. Parameters for such a location may include identifiers for any combination of a data center, a cage or suite, a cabinet, a patch panel, a physical port, and/or the like. Another type of parameter data specifies the components of the physical component (e.g., a connection type, a form factor, and/or the like). Other types of parameters identify various resources to be used as components in the interconnection. A number of other parameters are envisioned by the present disclosure.

As illustrated, example user interface 400 further includes GUI component 404 to present a form field into which a unique identifier for an authorized interconnection order is entered. While GUI component 404 is envisioned for at least one embodiment of the present disclosure, the A-side customer may authorize an interconnection order without accessing the order information using the unique identifier. This may be accomplished by activating GUI component 408 to authorize the order. In one example, GUI component may communicate a control directive in a function call to online procurement module 18 and that control directive is an authorization directive authorizing the interconnection.

There are a number of ways the A-side customer may receive the above-mentioned unique identifier. In some instances, the A-side customer receives a message (e.g., an email) containing the unique identifier as well as some information regarding a pending interconnection order from the Z-side customer. Regardless of the manner the A-side customer may receive the above-mentioned unique identifier, as an option, the A-side customer may use the unique identifier to access the set of parameters. As illustrated, A-side customer may enter the unique identifier into GUI component 404. In some examples, this unique identifier is included in a URL directing a browser component for example user interface 400 to the storage location for the set of parameters. The same URL may be inserted into an appropriate field in example user interface 400. Outputting the unique identifier to online procurement module 18 prompts online procurement module 18 to respond with the set of parameters. In one example, GUI components 406A-C of example user interface 400 presents the set of parameters as content including text indicating a data center location, a cage identifier or suite identifier, and a cabinet identifier. There are a number of additional parameters that may be presented to the A-side customer prior to authorization.

Embodiments of the subject matter described in this specification can be implemented in a computing system that includes a back end component, e.g., as a data center, a middleware component, e.g., an application server, and a front end component, e.g., a client computer having a graphical user interface or a Web browser through which a user can interact with an implementation of the subject matter described in this specification, or any combination of one or more such back end, middleware, or front end components.

The term automated, as used herein, may include performance by a computer or machine without user intervention; for example, by instructions responsive to a predicate action by the computer or machine or other initiation mechanism.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:
1. A method comprising:
obtaining, by a computing system operated by a data center provider for a data center, from a first customer of the data center provider, order information comprising a set of parameters defining an interconnection within the data center between a first customer network of the first customer and a second customer network of a second customer of the data center provider, wherein the first customer network and the second customer network are co-located in the data center;

validating, by a validation system, the set of parameters against an asset database that indicates availability of components referenced in the set of parameters;

sending, by the computing system to the second customer in response to validating that the components referenced in the set of parameters are available, a communication comprising a unique identifier that maps to the set of parameters;

outputting, by the computing system, an indication of authorization for the interconnection based upon an authorization directive from the second customer, the authorization directive comprising the unique identifier; and creating, by the data center provider in response to the indication of authorization, the interconnection according to the set of parameters.

2. The method of claim 1, wherein the communication comprises a uniform resource locator that comprises the unique identifier.

3. The method of claim 2, wherein the authorization directive comprises an activation of the uniform resource locator in the communication.

4. The method of claim 1, wherein the second customer communicates the authorization directive by entering the unique identifier into a user interface provided by the computing system.

5. The method of claim 1, further comprising:
in response to the authorization directive from the second customer, mapping the unique identifier to a record in a database, the record comprising the set of parameters, wherein the indication of authorization comprises at least one parameter from the set of parameters.

6. The method of claim 1, wherein sending the communication comprises mapping the unique identifier to a database record comprising the set of parameters.

7. The method of claim 1, wherein the set of parameters reference components of the data center, the method further comprising:
reserving, by the computing system, the components of the data center.

8. The method of claim 1, wherein the set of parameters are entered via a graphical user interface (GUI) and obtained by the computing system, the method further comprising:
generating the graphical user interface (GUI) to include at least one of a GUI component to receive the set of parameters and a GUI component to present the unique identifier.

9. The method of claim 1, wherein obtaining the order information further comprises generating a graphical user interface (GUI) to include a GUI component to present a form field to enter the unique identifier.

10. The method of claim 1, wherein obtaining the order information further comprises validating, by a validation system running on the first customer, the set of parameters for the order information.

11. A computing system operated by a data center provider for a data center, the computing system comprising processing circuitry coupled to memory and operative to execute logic that causes the processing circuitry to:
obtain, from a first customer of the data center provider, order information comprising a set of parameters defining an interconnection within the data center between a first customer network of the first customer and a second customer network of a second customer of the data center provider, wherein the first customer network and the second customer network are co-located in the data center;

validate, by a validation system, the set of parameters against an asset database that indicates availability of components referenced in the set of parameters;

send, to the second customer in response to validating that the components referenced in the set of parameters are available, a communication comprising a unique identifier that maps to the set of parameters; and output an indication of authorization for the interconnection based upon an authorization directive from the second customer, the authorization directive comprising the unique identifier, wherein outputting the indication of authorization causes the data center provider to create, in response to the indication of authorization, the interconnection according to the set of parameters.

12. The computing system of claim 11, wherein the communication comprises a uniform resource locator that comprises the unique identifier.

13. The computing system of claim 12, wherein the authorization directive comprises an activation of the uniform resource locator in the communication.

14. The computing system of claim 11, wherein the second customer network provider communicates the authorization directive by entering the unique identifier into a user interface provided by the computing system.

15. The computing system of claim 11, wherein the set of parameters are entered via a graphical user interface (GUI) and obtained by the computing system, the processing circuitry is further operative to execute logic that causes the processing circuitry to:
generate the graphical user interface (GUI) to include a GUI component to receive the set of parameters and a GUI component to present the unique identifier.

16. The computing system of claim 11, wherein the processing circuitry is further operative to execute logic that causes the processing circuitry to:
generate a graphical user interface (GUI) to include a GUI component to present a form field to enter the unique identifier.

17. A non-transitory computer-readable medium comprising processor-executable instructions that, when executed by a computing system operated by a data center provider for a data center, causes the computing system to:
obtain from a first customer of the data center provider, order information comprising a set of parameters defining an interconnection within the data center between a first customer network of the first customer and a second customer network of a second customer of the data center provider, wherein the first customer network and the second customer network are co-located in the data center;

validate the set of parameters against an asset database that indicates availability of components referenced in the set of parameters;

send, to the second customer in response to validating that the components referenced in the set of parameters are available, a communication comprising a unique identifier that maps to the set of parameters; and output an indication of authorization for the interconnection based upon an authorization directive from the second customer, the authorization directive comprising the unique identifier, wherein outputting the indication of authorization causes the data center provider to create, in response to the indication of authorization, the interconnection according to the set of parameters.

* * * * *